(12) United States Patent
Ma et al.

(10) Patent No.: US 11,359,140 B2
(45) Date of Patent: Jun. 14, 2022

(54) LIQUID CRYSTAL COMPOSITION AND LIQUID CRYSTAL DISPLAY DEVICE

(71) Applicant: JIANGSU HECHENG DISPLAY TECHNOLOGY CO., LTD., Yangzhong (CN)

(72) Inventors: Wenyang Ma, Yangzhong (CN); Wenming Han, Yangzhong (CN); Haibin Xu, Yangzhong (CN); Liwei Wang, Yangzhong (CN); Weigang Yan, Yangzhong (CN)

(73) Assignee: JIANGSU HECHENG DISPLAY TECHNOLOGY CO., LTD., Yangzhong (CN)

( * ) Notice: Subject to any disclaimer, the term of this patent is extended or adjusted under 35 U.S.C. 154(b) by 0 days.

(21) Appl. No.: 16/880,153

(22) Filed: May 21, 2020

(65) Prior Publication Data

US 2020/0385635 A1 Dec. 10, 2020

(30) Foreign Application Priority Data

Jun. 6, 2019 (CN) .......................... 201910489601.6

(51) Int. Cl.
*G02F 1/1333* (2006.01)
*C09K 19/30* (2006.01)
*C09K 19/12* (2006.01)
*C09K 19/34* (2006.01)

(52) U.S. Cl.
CPC .......... *C09K 19/3003* (2013.01); *C09K 19/12* (2013.01); *C09K 19/3028* (2013.01); *C09K 19/3059* (2013.01); *C09K 19/3068* (2013.01); *C09K 19/3402* (2013.01); *C09K 2019/122* (2013.01); *C09K 2019/301* (2013.01); *C09K 2019/303* (2013.01); *C09K 2019/3009* (2013.01); *C09K 2019/3015* (2013.01); *C09K 2019/3021* (2013.01); *C09K 2019/3025* (2013.01); *C09K 2019/3027* (2013.01); *C09K 2019/3063* (2013.01); *C09K 2019/3071* (2013.01); *C09K 2019/3078* (2013.01); *C09K 2019/3422* (2013.01)

(58) Field of Classification Search
CPC ................ C09K 19/3003; C09K 19/12; C09K 19/3059; C09K 19/3028; C09K 19/3068; C09K 19/3402; C09K 19/3098; C09K 19/44; C09K 2019/3078; C09K 2019/301; C09K 2019/3422; C09K 2019/3009; C09K 2019/3027; C09K 2019/122; C09K 2019/3025; C09K 2019/3021; C09K 2019/3015; C09K 2019/3063; C09K 2019/303; C09K 2019/3071; C09K 2019/3077; G02F 1/1333
See application file for complete search history.

(56) References Cited

U.S. PATENT DOCUMENTS

2020/0024518 A1* 1/2020 Tsai ................... C09K 19/3028

FOREIGN PATENT DOCUMENTS

| CN | 105586052 A | 5/2016 | |
|---|---|---|---|
| CN | 107663458 A | 2/2018 | |
| CN | 108690640 | * 10/2018 | ............ C09K 19/32 |
| CN | 108690640 A | 10/2018 | |
| CN | 109575943 A | 4/2019 | |
| CN | 110577832 A | 12/2019 | |

* cited by examiner

*Primary Examiner* — Geraldina Visconti
(74) *Attorney, Agent, or Firm* — Brown Rudnick LLP

(57) ABSTRACT

Disclosed are a liquid crystal composition and a liquid crystal display device. The liquid crystal composition comprises at least one compound of general formula I, at least one compound of general formula II, at least one compound of general formula III, and at least one compound of general formula IV. By compounding the four compounds, the composition can have advantages of a wide temperature range of nematic phase, a low viscosity and a low threshold voltage, and the liquid crystal display element can have a short response time and great power saving performance.

20 Claims, No Drawings

LIQUID CRYSTAL COMPOSITION AND LIQUID CRYSTAL DISPLAY DEVICE

CROSS-REFERENCES TO RELATED APPLICATIONS

The present disclosure claims the benefit of Chinese Application No. 201910489601.6, filed on Jun. 6, 2019 to the CNIPA, the content of which is incorporated by reference herein in its entirety.

TECHNICAL FIELD

The present disclosure belongs to the field of liquid crystal materials, and relates to a liquid crystal composition and a liquid crystal display device.

BACKGROUND

The liquid crystal display (LCD) has been rapidly developed because of its small size, light weight, low power consumption and great display quality, and thus has been widely used especially in portable electronic information products. With the increase of the size of LCD screens for portable computers, office applications and video applications, the liquid crystal display can be used for large screen display and eventually replace cathode ray tubes (CRTs).

According to the display mode, the display is classified into phase change (PC) display, twist nematic (TN) display, super twisted nematic (STN) display, electrically controlled birefringence (ECB) display, optically compensated bend (OCB) display, in-plane switching (IPS) display, vertical alignment (VA) display, and the like.

Recently, the liquid crystal compound is used more widely, and can be applied in various kinds of displays, electro-optical devices, sensors and the like. Various kinds of liquid crystal compounds are used in the above display fields, among which the nematic liquid crystal is most widely used. The nematic liquid crystal has been used in passive TN and STN matrix displays and systems with a TFT active matrix.

The liquid crystal material needs to have a proper high dielectric anisotropy, a proper high optical anisotropy, a good low-temperature mutual solubility and a good thermal stability. In addition, the liquid crystal material also should have a low viscosity, a short response time, a low threshold voltage and a high contrast. The temperature range of nematic phase is associated with the range of working temperature of the element. The upper-limit temperature of nematic phase is preferably greater than or equal to 70° C., and the lower-limit temperature of nematic phase is preferably less than or equal to −10° C. The viscosity of the composition is associated with the response time of the element. In order to display animation in the element, the element is preferred to have a short response time. Therefore, the composition is preferred to have a small viscosity, and is more preferred to have a small viscosity at a low temperature.

The ideal AM element has characteristics of a wide available temperature range, a short response time, a large contrast, a low critical voltage, a large voltage holding ratio and a long life-time and the like. Therefore, it is ideal that the composition has characteristics of a high upper-limit temperature of nematic phase, a low lower-limit temperature of nematic phase, a small viscosity, a large optical anisotropy and a large dielectric constant anisotropy.

Thus, it is very necessary to provide a liquid crystal composition having a wide temperature range of nematic phase, a low viscosity and a low threshold voltage.

SUMMARY

The present disclosure provides a liquid crystal composition and a liquid crystal display device. The liquid crystal composition of the present disclosure has advantages of a wide temperature range of nematic phase, a low viscosity and a low threshold voltage, and the liquid crystal display element has a short response time and great power saving performance.

In one aspect, the present disclosure provides a liquid crystal composition. The liquid crystal composition includes at least one compound of general formula I, at least one compound of general formula II, at least one compound of general formula III, and at least one compound of general formula IV:

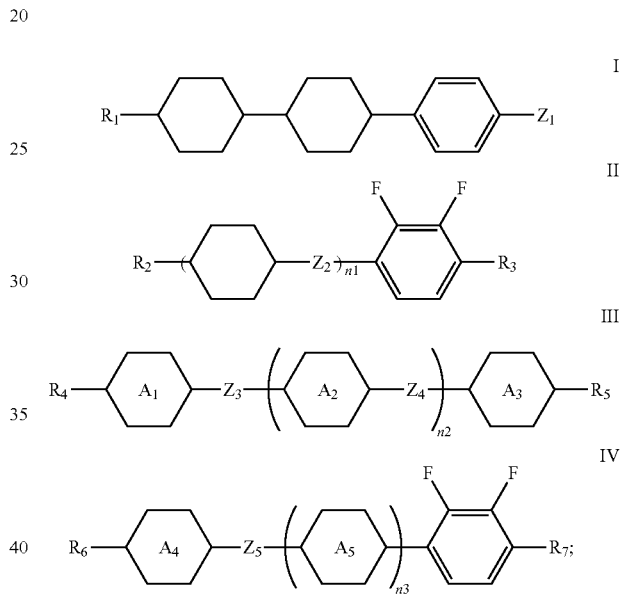

wherein, $R_1$, $R_2$, $R_3$, $R_4$, $R_5$, $R_6$ and $R_7$ each independently represent a linear or branched alkyl or alkoxy containing 1 to 10 carbon atoms or a linear or branched alkenyl or alkenyloxy containing 2 to 12 carbon atom, wherein the 1 to 10 carbon atoms may be 1 carbon atom, 2 carbon atoms, 3 carbon atoms, 4 carbon atoms, 5 carbon atoms, 6 carbon atoms, 7 carbon atoms, 8 carbon atoms, 9 carbon atoms or 10 carbon atoms, and the 2 to 12 carbon atoms may be 2 carbon atoms, 3 carbon atoms, 4 carbon atoms, 5 carbon atoms, 6 carbon atoms, 7 carbon atoms, 8 carbon atoms, 9 carbon atoms, 10 carbon atoms, 11 carbon atoms or 12 carbon atoms, and exemplarily selected from —$CH_3$, —$CH_2$—$CH_3$,

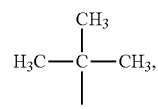

—$CH_2$—O—, —$CH_2$—O—$CH_2$—, —CH=CH—, —CH=CH—$CH_2$—, —CH=CH—O— and the like;

$Z_1$ represents a linear or branched alkenyl containing 2 to 7 carbon atoms, wherein the 2 to 7 carbon atoms may be 2 carbon atoms, 3 carbon atoms, 4 carbon atoms, 5 carbon atoms, 6 carbon atoms, or 7 carbon atoms;

$Z_2$ represents a single bond, —$CH_2$—O—, —O—$CH_2$—, —CO—O—, —O—CO—, —CH=CH— or —$CH_2$—$CH_2$—;

$Z_3$, $Z_4$, and $Z_5$ each independently represent a single bond, —COO—, —$CH_2$—$CH_2$—, —CH=CH— or —$CH_2$—O—;

n1 represents 1 or 2;

the ring

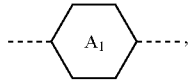

the ring

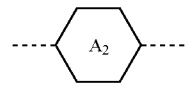

and the ring

each independently represent

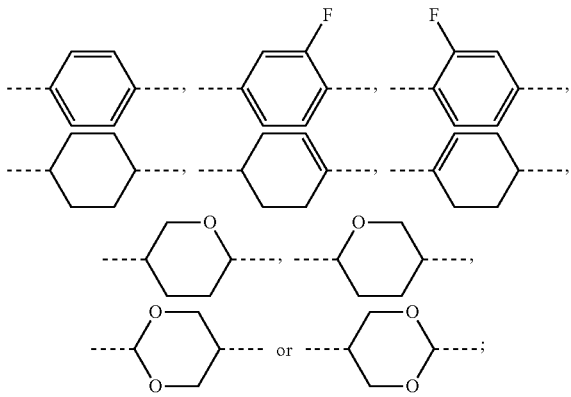

n2 represents 0, 1 or 2, and when n2 represents 2, ring

is the same or different;
the ring

and the ring

each independently represent

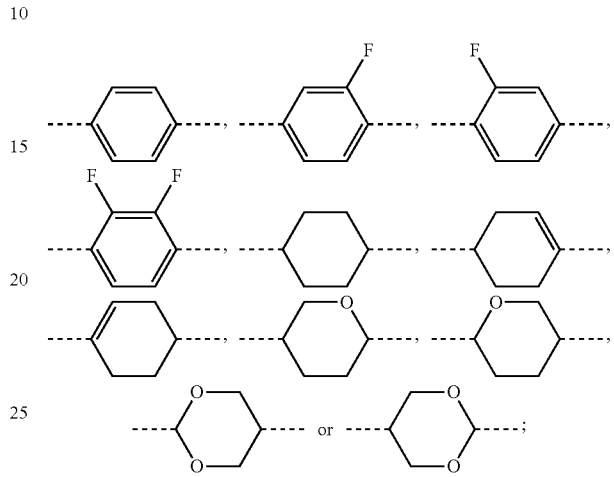

n3 represents 0, 1 or 2, and when n3 represents 2, ring

is the same or different;

wherein the dashed line represents an attachment position, and the dashed lines in the present application represent an attachment position, which will no longer be repeated hereinafter;

wherein the compound of general formula III does not include the compound of general formula I, and the compound of general formula IV does not include the compound of general formula II.

In the present disclosure, since the liquid crystal composition contains the compound of general formula I, the compound of general formula II, the compound of general formula III and the compound of general formula IV, the cooperation of these components makes this composition have advantages of a wide nematic phase width, a low viscosity and a low threshold voltage.

Preferably, the compound of general formula I accounts for 1% to 40%, such as 1%, 5%, 10%, 15%, 20%, 25%, 30%, 35%, 40%, etc., preferably 5% to 35%, further preferably 5% to 30%, of the total weight of the liquid crystal composition.

Preferably, the compound of general formula. II accounts for 1% to 70%, such as 1%, 5%, 10%, 15%, 20%, 25%, 30%, 35%, 40%, 45%, 50%, 55%, 60%, 65%, 70%, etc., preferably 5% to 65%, further preferably 5% to 60%, of the total weight of the liquid crystal composition.

Preferably, the compound of general formula III accounts for 10% to 70%, such as 10%, 15%, 20%, 25%, 30%, 35%, 40%, 45%, 50%, 55%, 60%, 65%, 70%, etc., preferably 15% to 65%, further preferably 20% to 60%, of the total weight of the liquid crystal composition.

Preferably, the compound of general formula IV accounts for 1% to 50%, such as 1%, 5%, 10%, 15%, 20%, 25%, 30%, 35%, 40%, 45%, 50%, etc., preferably 1% to 40%, further preferably 1% to 35%, of the total weight of the liquid crystal composition.

Preferably, the compound of general formula I is any one or a combination of at least two of compounds having the following structures:

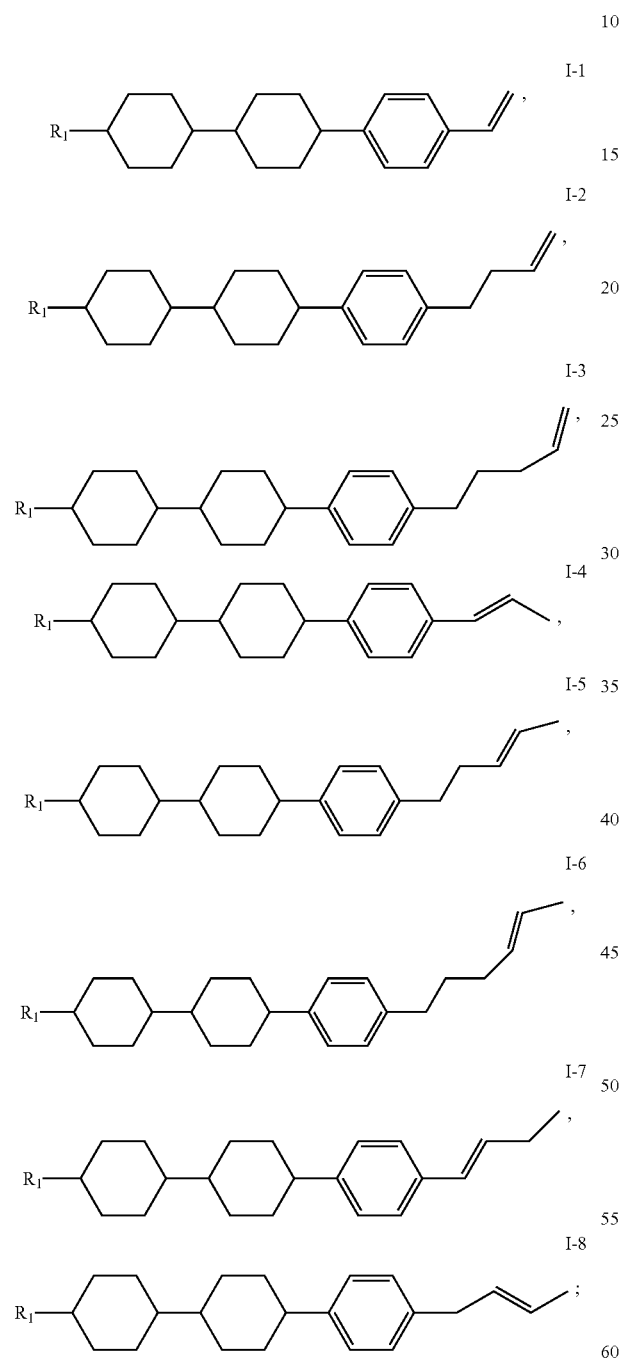

wherein, $R_1$ has the same range as defined in above description.

Preferably, the compound of general formula II is any one or a combination of at least two of compounds having the following structures:

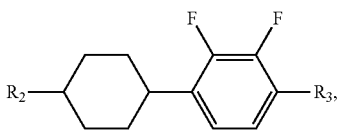

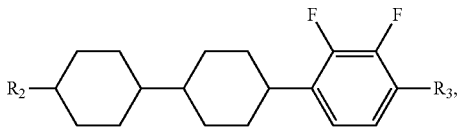

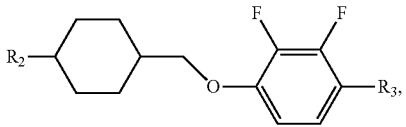

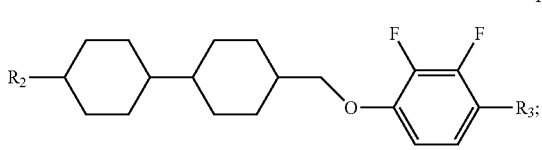

wherein, $R_2$ and $R_3$ each independently have the same range as defined in above description.

Preferably, the compound of general formula III is any one or a combination of at least two of compounds having the following structures:

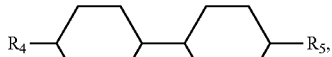

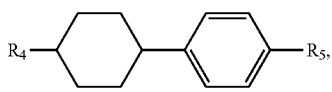

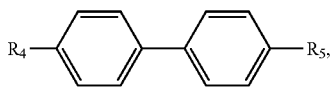

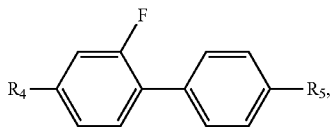

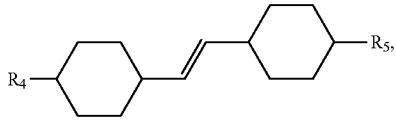

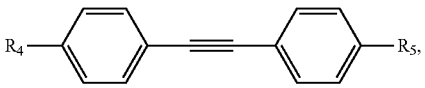

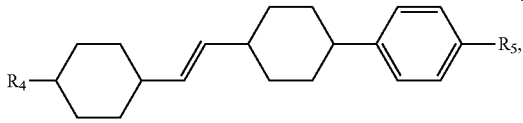

III-8

III-9
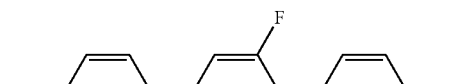

III-10
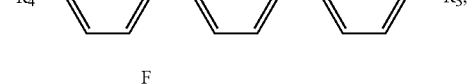

III-11
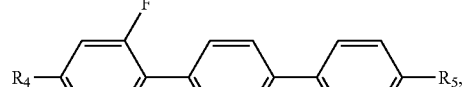

III-12
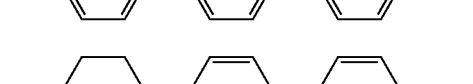

III-13
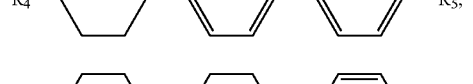

III-14
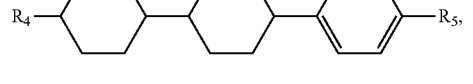

III-15
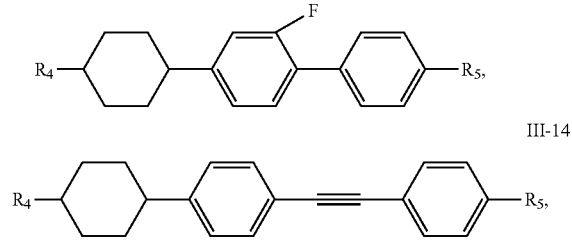

III-16
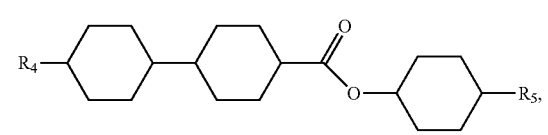

III-17
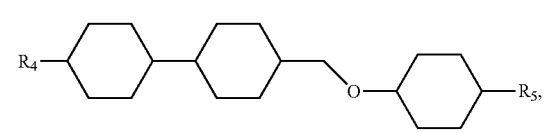

III-18
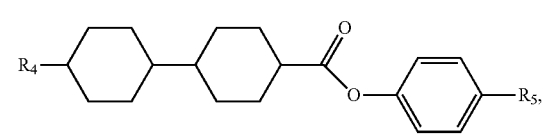

III-19
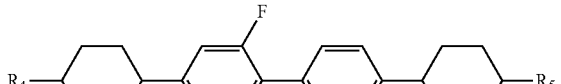

III-20
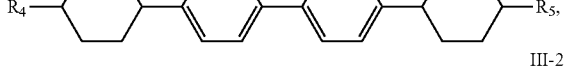

III-21
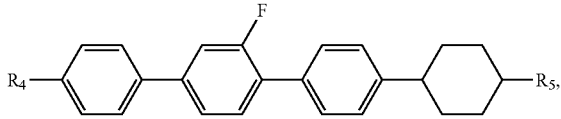

III-22

III-23
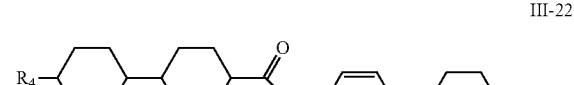

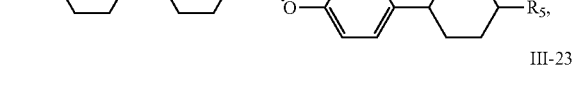

$R_4$ and $R_5$ have the same range as defined in above description.

Preferably, the compound of general formula III is any one or a combination of at least two of compounds having structures of III-1, III-2, III-3, III-4, III-9, III-11, III-12, III-13, III-15, III-16, III-17, III-18, III-19, III-20, III-21, III-22 and III-23.

Preferably, the compound of general formula III is any one or a combination of at least two of compounds having structures of III-1, III-3, III-11, III-13, III-16, III-21, III-22 and III-23.

Preferably, in the compound of general formula III-1, the compound of general formula III-2 and the compound of general formula III-3, at least one of $R_4$ and $R_5$ represents a halogenated or unhalogenated linear alkenyl or alkenyloxy containing 2 to 10 carbon atoms, wherein the 2 to 10 carbon atoms may be 2 carbon atoms, 3 carbon atoms, 4 carbon atoms, 5 carbon atoms, 6 carbon atoms, 7 carbon atoms, 8 carbon atoms, 9 carbon atoms, or 10 carbon atoms.

Preferably, the compound of general formula IV is any one or a combination of at least two of compounds having the following structures:

IV-1
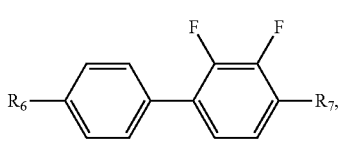

IV-2
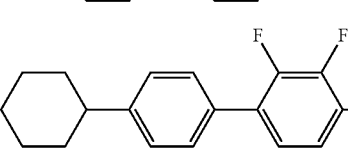

-continued

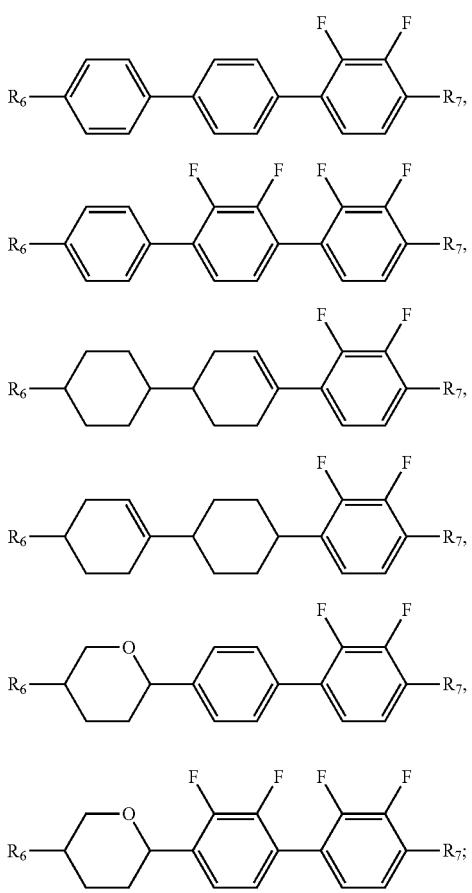

wherein, $R_6$ and $R_7$ each independently have the same range as defined in above description.

In another aspect, the present disclosure provides a liquid crystal display device. The liquid crystal display device includes the liquid crystal composition described above.

The liquid crystal display device in the present disclosure has a short response time and great power saving performance.

Compared with the existing art, the present disclosure has the following beneficial effects:

The liquid crystal composition of the present disclosure has advantages of a wide temperature range of nematic phase (wherein the range of Δn is 0.1050 to 0.1216), a low viscosity (γ1 is as low as 112 mPa·s) and a low threshold voltage ($V_{th}$ is as low as 2.225 V), and the liquid crystal display element has a short response time and great power saving performance.

DETAILED DESCRIPTION

The technical solutions of the present disclosure are further described below through specific embodiments. Those skilled in the art should understand that the embodiments are merely used to help understand the present disclosure and should not be regarded as specific limitations to the present disclosure.

For ease of expression, in the following examples, the group structures of the liquid crystal composition are represented by the codes listed in Table 1.

TABLE 1

Group structure code for compound in the liquid crystal composition

| Group Unit Structure | Code | Group Name |
|---|---|---|
| | C | 1,4-cyclohexylene |
| | C(N) | 1-cyano-1,4-cyclohexylene |
| | P | 1,4-phenylene |
| | I | indan-2,5-diyl |
| | G | 2-fluoro-1,4-phenylene |
| | U | 2,6-difluoro-1,4-phenylene |
| | W | 2,3-difluoro-1,4-phenylene |
| | P(F, Cl) | 2-chloro-3-fluoro-1,4-phenylene |
| | P(2N) | 2,3-dicyano-1,4-phenylene |
| | W(1) | 2,3-difluoro-6-methyl-1,4-phenylene |
| | Na(3F) | 1,2,8-trifluoro-3,7-naphthylene |

TABLE 1-continued

Group structure code for compound in the liquid crystal composition

| Group Unit Structure | Code | Group Name |
|---|---|---|
| (cyclohexane with O at top) | A | 2-oxohexacyclo |
| (cyclohexane with O at position 3) | AI | 3-oxohexacyclo |
| (1,3-dioxane ring) | D | 1,3-dioxane-2,5-diyl |
| (CF₂–O– group) | Q or 1(2F)O | difluoro ether group |
| —O— | O | oxygen substituent group |
| —F | F | fluorine substituent group |
| —CH=CH— | V | alkenyl |
| —C≡C— | T | alkynyl |
| (CF=CF group) | V(2F) | diflurooalkenyl |
| —COO— | E | ester bridge bond |
| —$C_nH_{2n+1}$ or —$C_mH_{2m+1}$ | n or m | alkyl |
| (cyclohexenyl ring) | L | 2-alkenyl-1,4-cyclohexylene |

The structure codes will be described with a compound having the following structural formula as an example:

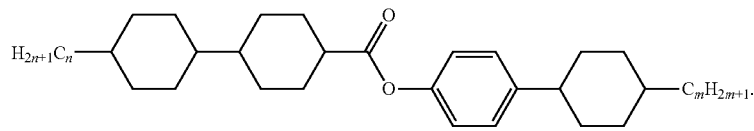

The structural formula can be expressed as nCCEPCm if it is represented by the codes shown in Table 1, wherein n represents the number of carbon atoms of the alkyl on the left end, for example, a case where n is 3 represents that the alkyl is —$C_3H_7$; C represents a cyclohexylene group; E represents an ester group; P represents a phenylene; and m represents the number of carbon atoms of the alkyl on the right end, for example, a case where m is 2 represents that the alkyl is —$C_2H_5$.

In the following examples, abbreviated codes of the performance test items are shown in Table 2.

TABLE 2

Abbreviated code for performance test item

| Test Item Code | Meaning |
|---|---|
| Δn | optical anisotropy (589 nm, 25° C.) |
| Δε | dielectric anisotropy (1 KHz, 25° C.) |
| Cp | liquid crystal clearing point |
| γ1 | rotary viscosity (mPa · s, 25° C.) |
| Tc | low-temperature storage phase change point (i.e., the lower-limit temperature of nematic phase, ° C.) |
| $V_{th}$ | threshold voltage (the characteristic voltage at a relative transmittance of 10%) |
| η | kinetic viscosity (cP, 25° C.) |

Wherein, the Cp (clearing point) was measured in a differential scanning calorimetry (DSC) quantitative manner.

The Δn (optical anisotropy) was measured by an Abel tester at a test temperature of 25° C. and a test wavelength of 589 nm.

The Δε (dielectric anisotropy) (Δε=ε//−ε⊥, wherein ε// is a dielectric constant parallel to the molecular axis, and −ε⊥ is a dielectric constant perpendicular to the molecular axis) was measured at a test temperature of 25±0.5° C.

The γ1 (rotary viscosity) was measured by INSTEC: ALCTIRI under the test conditions of 25±0.5° C. with a 20 μm parallel box.

The η (kinetic viscosity) was measured by an E-type viscometer under the test conditions of 25±0.5° C.

The $V_{th}$ (threshold voltage) was measured under the test conditions of C/1 KHz and VA5.8.

Each component adopted by the liquid crystal composition in the following examples can be synthesized by a well-known method or can be obtained commercially, and each component of the obtained liquid crystal compositions meets the standards of electronic compounds after testing.

Liquid crystal compositions in the following examples were obtained by mixing each component according to the proportion of each component (the general formula to which each component belongs is shown in the parentheses at the end of the component in each example) and by conventional preparation methods such as heating, ultrasonic wave, suspending, etc.

Example 1

In this example, the liquid crystal composition includes components in the mass percentage content as shown in the following table, and its performance test results are listed in the following table.

| Component | Content (%) | Test | |
|---|---|---|---|
| 3CPP2 (III-11) | 6 | Cp (° C.) | 80.5 |
| 3CPPC3 (II-23) | 2 | Δn | 0.1059 |
| 3CWO2 (II-1) | 11 | Δε | −3.07 |
| 2C1OWO2 (II-3) | 5 | η (cP, 25° C.) | 14.5 |
| 3CC1OWO2 (II-4) | 5 | γ1 (mPa · S) | 115 |
| 3CCWO2 (II-2) | 10 | Tc (° C.) | <−20 |
| 5CCWO2 (II-2) | 7 | $V_{th}$ (V) | 2.236 V |
| 3CC2 (III-1) | 8 | | |
| 4CPWO2 (IV-2) | 4 | | |
| 5PP1 (II-3) | 13 | | |
| 3CCV1 (II-1) | 7.5 | | |
| 2CWO2 (II-1) | 8.5 | | |
| 4CWO2 (II-1) | 3 | | |
| 2CCP2V1 (I-5) | 6 | | |
| 3CCP2V1 (I-5) | 4 | | |

Example 2

In this example, the liquid crystal composition includes components in the mass percentage content as shown in the following table, and its performance test results are listed in the following table.

| Component | Content (%) | Test | |
|---|---|---|---|
| 3CGP2 (III-13) | 6 | Cp (° C.) | 82.3 |
| 3CPGP3 (III-21) | 2 | Δn | 0.1052 |
| 3CWO2 (II-1) | 11 | Δε | −3.13 |
| 2CC1OWO2 (I-4) | 5 | η (cP, 25° C.) | 14.6 |
| 3CC1OWO2 (II-4) | 5 | γ1 (mPa · S) | 118 |
| 3CCWO2 (II-2) | 8 | Tc (° C.) | <−20 |
| 5CCWO2 (II-2) | 4 | $V_{th}$ (V) | 2.225 |
| 3CC2 (III-1) | 8 | | |
| 4CPWO2 (IV-2) | 4 | | |
| 5PP1 (III-3) | 13 | | |
| 3CCV1 (III-1) | 7.5 | | |
| 2CWO2 (II-1) | 8.5 | | |
| 4CWO2 (II-1) | 8 | | |
| 2CCP2V1 (I-5) | 6 | | |
| 3CCP2V1 (I-5) | 4 | | |

Example 3

In this example, the liquid crystal composition includes components in the mass percentage content as shown in the following table, and its performance test results are listed in the following table.

| Component | Content (%) | Test | |
|---|---|---|---|
| 3CPO2 (III-2) | 9 | Cp (° C.) | 78.8 |
| 3CCP2V1 (I-5) | 10.5 | Δn | 0.1093 |
| 3CWO2 (I-1) | 5 | Δε | −2.19 |
| 5CWO2 (II-1) | 8 | η (cP, 25° C.) | 15.2 |
| 2CPWO2 (IV-2) | 7 | γ1 (mPa · S) | 118 |
| 3CPWO4 (IV-2) | 8.5 | Tc (° C.) | <−20 |
| 3CCWO2 (II-2) | 10 | $V_{th}$ (V) | 2.526 |
| 4CCWO2 (II-2) | 5 | | |
| 3CC2 (III-1) | 20 | | |
| 4CC3 (III-1) | 9 | | |
| VCW04 (II-1) | 8 | | |

Example 4

In this example, the liquid crystal composition includes components in the mass percentage content as shown in the following table, and its performance test results are listed in the following table.

| Component | Content (%) | Test | |
|---|---|---|---|
| 3VCPO2 (III-2) | 9 | Cp (° C.) | 79.6 |
| 3CCP2V1 (I-5) | 10.5 | Δn | 0.115 |
| 3PWO2 (IV-1) | 3 | Δε | −2.59 |
| 5PWO2 (IV-1) | 8 | η (cP, 25° C.) | 16.2 |
| 2CPWO2 (IV-2) | 7 | γ1 (mPa · S) | 126 |
| 3CPWO4 (IV-2) | 8.5 | Tc (° C.) | <−20 |
| 3CCWO2 (II-2) | 10 | $V_{th}$ (V) | 2.435 |
| 4CCWO2 (II-2) | 5 | | |
| 3CC2 (III-1) | 20 | | |
| 4CC3 (III-1) | 9 | | |
| VCWO4 (II-1) | 10 | | |

Example 5

In this example, the liquid crystal composition includes components in the mass percentage content as shown in the following table, and its performance test results are listed in the following table.

| Component | Content (%) | Test | |
|---|---|---|---|
| 3CPP2 (III-11) | 9.5 | Cp (° C.) | 83.8 |
| 3C1OWO2 (II-3) | 5.5 | Δn | 0.1216 |
| 2PPWO2 (IV-3) | 4 | Δε | −3.21 |
| 3PPWO2 (IV-3) | 6.5 | η (cP, 25° C.) | 16.6 |
| 4PPWO2 (IV-3) | 6.5 | γ1 (mPa · S) | 118 |
| 3PPO2 (III-3) | 5 | Tc (° C.) | <−20 |
| 3CCV (III-1) | 18.5 | $V_{th}$ (V) | 2.245 |
| 3CCV1 (III-1) | 12 | | |
| 2C1OWO2 (II-3) | 6.5 | | |
| 4C1OWO2 (II-3) | 6 | | |
| 2CCP2V (I-2) | 5 | | |
| 3CCP2V (I-2) | 3.5 | | |
| 1VCPWO2 (IV-2) | 2 | | |
| 1V2PWO2 (IV-1) | 6 | | |
| 1VCPWO4 (IV-2) | 3.5 | | |

Example 6

In this example, the liquid crystal composition includes components in the mass percentage content as shown in the following table, and its performance test results are listed in the following table.

| Component | Content (%) | Test | |
|---|---|---|---|
| 3CPP2 (III-11) | 9.5 | Cp (° C.) | 83.2 |
| 3C1OWO2 (II-3) | 5 | Δn | 0.1085 |
| 2CC1OWO2 (II-4) | 2 | Δε | −2.85 |
| 3CC1OWO2 (II-4) | 4 | η (cP, 25° C.) | 15.7 |
| 4CC1OWO2 (II-4) | 1 | γ1 (mPa · S) | 113 |
| 3CCV (III-1) | 20.5 | Tc (° C.) | <−20 |
| 3CCV1 (III-1) | 12 | $V_{th}$ (V) | 2.375 |
| 2C1OWO2 (II-3) | 7.5 | | |
| 4C1OWO2 (II-3) | 8 | | |
| 2CCP2V (I-2) | 5 | | |
| 3CCP2V1 (I-5) | 3.5 | | |
| 1VCPWO2 (IV-2) | 7 | | |
| 1V2PWO2 (IV-1) | 7.5 | | |
| 1VCPWO4 (IV-2) | 7.5 | | |

Example 7

In this example, the liquid crystal composition includes components in the mass percentage content as shown in the following table, and its performance test results are listed in the following table.

| Component | Content (%) | Test | |
|---|---|---|---|
| 3CC1OC2 (III-16) | 9.5 | Cp (° C.) | 81.8 |
| 3C1OWO2 (II-3) | 5 | Δn | 0.1050 |
| 2PWWO2 (IV-4) | 2 | Δε | −3.12 |
| 3PWWO2 (IV-4) | 4 | η (cP, 25° C.) | 15.8 |
| 4PWWO2 (IV-4) | 1 | γ1 (mPa · S) | 112 |
| 3CCV (III-1) | 20.5 | Tc (° C.) | <−20 |
| 3CCV1 (III-1) | 12 | $V_{th}$ (V) | 2.318 |
| 2C1OWO2 (II-3) | 7.5 | | |
| 4C1OWO2 (II-3) | 8 | | |
| 2CCP2V (I-2) | 2 | | |
| 3CCP3V (I-3) | 6.5 | | |
| 1VCPWO2 (IV-2) | 7 | | |
| 1V2PWO2 (IV-1) | 7.5 | | |
| 1VCPWO4 (IV-2) | 7.5 | | |

Example 8

In this example, the liquid crystal composition includes components in the mass percentage content as shown in the following table, and its performance test results are listed in the following table.

| Component | Content (%) | Test | |
|---|---|---|---|
| 3CPPC3 (III-23) | 2 | Cp (° C.) | 78.9 |
| 3CPP2 (III-11) | 4 | Δn | 0.1126 |
| 3CWO2 (II-1) | 11 | Δε | −3.37 |
| 2C1OWO2 (II-3) | 5 | η (cP, 25° C.) | 14.2 |
| 3C1OWO2 (II-3) | 5 | γ1 (mPa · S) | 122 |
| 3CCWO2 (II-2) | 8 | Tc (° C.) | <−20 |
| 5CCWO2 (II-2) | 10 | $V_{th}$ (V) | 2.237 |
| 3CC2 (III-1) | 8 | | |
| 4C1OWO2 (II-3) | 4 | | |
| 5PP1 (III-3) | 8 | | |
| 3CCV1 (III-1) | 7.5 | | |
| 2CWO2 (II-1) | 5.5 | | |
| 4CWO2 (II-1) | 5 | | |
| 3PWP4 | 2 | | |
| 2CCP1V1 (I-8) | 6 | | |
| 3CCP2V1 (I-5) | 4 | | |
| 2CCP3V1 (I-6) | 5 | | |

Example 9

In this example, the liquid crystal composition includes components in the mass percentage content as shown in the following table, and its performance test results are listed in the following table.

| Component | Content (%) | Test | |
|---|---|---|---|
| 3CCPV2 (I-7) | 9 | Cp (° C.) | 82.3 |
| 2CCP2V1 (I-5) | 9 | Δn | 0.117 |
| 2CCPV1 (I-4) | 4 | Δε | −3.06 |
| 3CCEPC3 (III-22) | 1 | η (cP, 25° C.) | 15.2 |
| 3CPWO4 (IV-2) | 4 | γ1 (mPa · S) | 125 |
| 5C1OWO2 (II-3) | 11 | Tc (° C.) | <−20 |
| 3CC1OO2 (II-4) | 10 | $V_{th}$ (V) | 2.355 |
| 2CC1OWO2 (II-4) | 9 | | |
| 4CCWO2 (II-2) | 3 | | |
| 3CC2 (III-1) | 21 | | |
| 5PP1 (III-3) | 13 | | |
| 2C1OWO2 (I-3) | 5 | | |
| 3PWO2 (IV-1) | 1 | | |

Comparative Example 1

In this example, the liquid crystal composition includes components in the mass percentage content as shown in the following table, and its performance test results are listed in the following table.

| Component | Content (%) | Test | |
|---|---|---|---|
| 3CPP2 (III-11) | 6 | Cp (° C.) | 73.9 |
| 3CPPC3 (III-23) | 2 | Δn | 0.1068 |
| 3CWO2 (II-1) | 11 | Δε | −3.01 |
| 2C1OWO2 (II-3) | 5 | η (cP, 25° C.) | 14.7 |
| 3CC1OWO2 (II-4) | 5 | γ1 (mPa · S) | 122 |
| 3CCWO2 (II-2) | 10 | Tc (° C.) | <−10 |
| 5CCWO2 (II-2) | 7 | $V_{th}$ (V) | 2.365 |
| 3CC2 (III-1) | 8 | | |
| 4CPWO2 (IV-2) | 4 | | |
| 5PP1 (III-3) | 13 | | |
| 3CCV1 (III-1) | 7.5 | | |
| 2CWO2 (II-1) | 8.5 | | |
| 4CWO2 (II-1) | 3 | | |
| 2CPP2V1 (III-11) | 6 | | |
| 3CPP2V1 (III-11) | 4 | | |

As is seen from a comparison of Examples 1 to 9 with Comparative example 1, the liquid crystal compound of the present disclosure has a small rotational viscosity, a wide temperature range of nematic phase and a short response time.

The Applicant declares that the above are only specific embodiments of the present disclosure and are not intended to limit the scope of the present disclosure. It is easy for those skilled in the art to conceive modifications or substitutions within the technical scope of the present disclosure. These modifications or substitutions are within the scope of the present disclosure.

What is claimed is:

1. A liquid crystal composition, comprising at least two compounds of general formula I, at least one compound of general formula II, at least one compound of general formula III, and at least one compound of general formula IV:

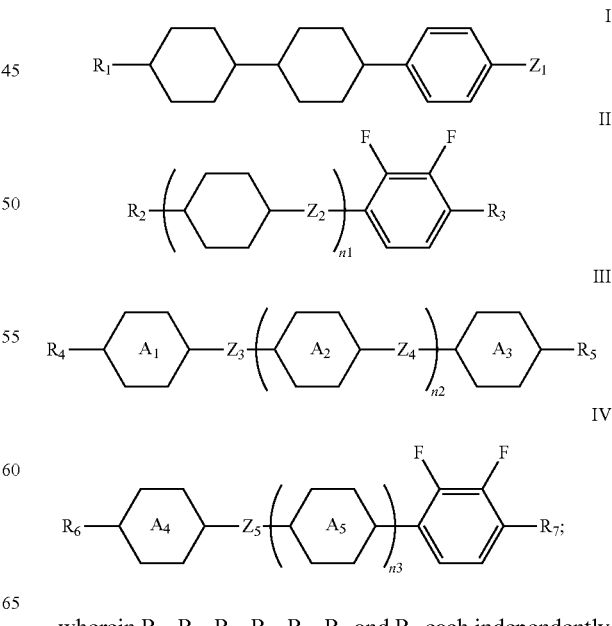

wherein $R_1$, $R_2$, $R_3$, $R_4$, $R_5$, $R_6$ and $R_7$ each independently represent a linear or branched alkyl or alkoxy containing 1 to 10 carbon atoms or a linear or branched alkenyl or alkenyloxy containing 2 to 12 carbon atoms;

$Z_1$ represents a linear or branched alkenyl containing 4 to 7 carbon atoms;

$Z_2$ represents —$CH_2$—O—, —O—$CH_2$—, —CO—O—, —O—CO—, —CH=CH— or —$CH_2$—$CH_2$—;

$Z_3$, $Z_4$, and $Z_5$ each independently represent a single bond, —COO—, —$CH_2$—$CH_2$—, —CH=CH— or —$CH_2$—O—;

n1 represents 1 or 2;

the ring

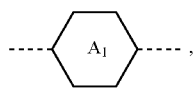, the ring

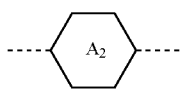

and the ring

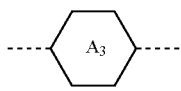

each independently represent

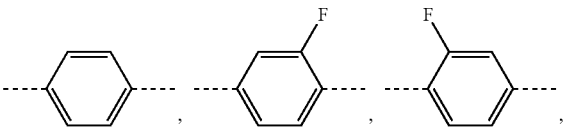

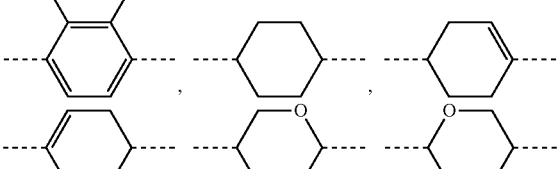

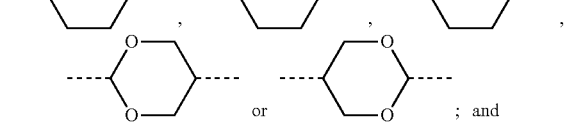

n2 represents 0, 1 or 2, and when n2 represents 2, ring

is the same or different;

the ring

and the ring

each independently represent

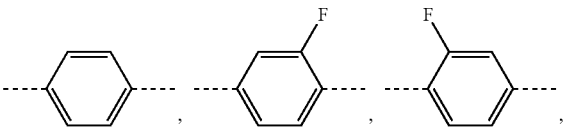

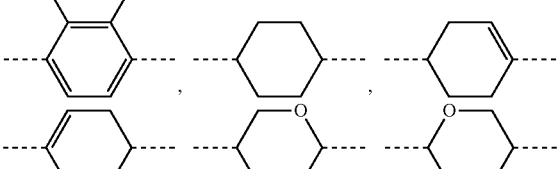

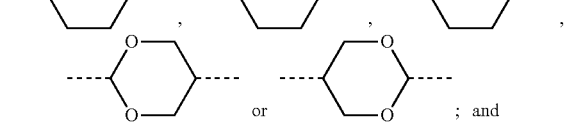
; and n3 represents 0, 1 or 2, and when n3 represents 2, ring

is the same or different;

wherein the dashed line represents an attachment position;
wherein the compound of general formula III does not comprise the compound of general formula I, and the compound of general formula IV does not comprise the compound of general formula II.

2. The liquid crystal composition of claim 1, wherein the compound of general formula I accounts for 1% to 40% of the total weight of the liquid crystal composition.

3. The liquid crystal composition of claim 2, wherein the compound of general formula I accounts for preferably 5% to 35% of the total weight of the liquid crystal composition.

4. The liquid crystal composition of claim 3, wherein the compound of general formula I accounts for preferably 5% to 30% of the total weight of the liquid crystal composition.

5. The liquid crystal composition of claim 1, wherein the compound of general formula II accounts for 1% to 70% of the total weight of the liquid crystal composition.

6. The liquid crystal composition of claim 5, wherein the compound of general formula II accounts for preferably 5% to 65% of the total weight of the liquid crystal composition.

7. The liquid crystal composition of claim 6, wherein the compound of general formula II accounts for preferably 5% to 60% of the total weight of the liquid crystal composition.

8. The liquid crystal composition of claim 1, wherein the compound of general formula III accounts for 10% to 70% of the total weight of the liquid crystal composition.

9. The liquid crystal composition of claim 8, wherein the compound of general formula III accounts for preferably 15% to 65% of the total weight of the liquid crystal composition.

10. The liquid crystal composition of claim 9, wherein the compound of general formula III accounts for preferably 20% to 60% of the total weight of the liquid crystal composition.

11. The liquid crystal composition of claim 1, wherein the compound of general formula IV accounts for 1% to 50% of the total weight of the liquid crystal composition.

12. The liquid crystal composition of claim 11, wherein the compound of general formula IV accounts for preferably 1% to 40% of the total weight of the liquid crystal composition.

13. The liquid crystal composition of claim 12, wherein the compound of general formula IV accounts for preferably 1% to 35% of the total weight of the liquid crystal composition.

14. The liquid crystal composition of claim 1, wherein the compound of general formula I is a combination of at least two of compounds having the following structures:

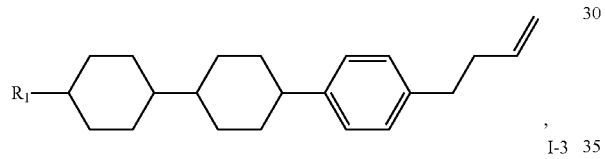
I-2

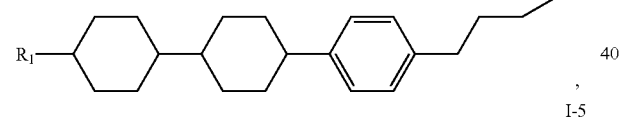
I-3

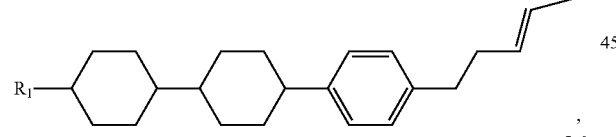
I-5

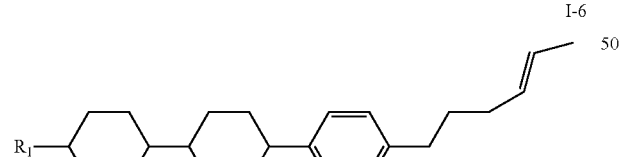
I-6

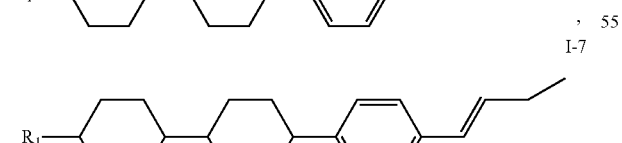
I-7

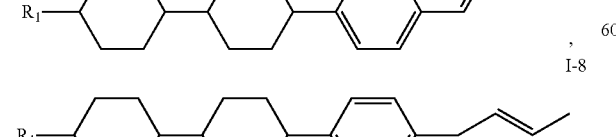
I-8

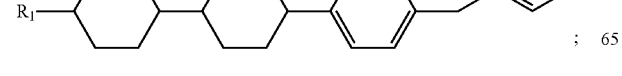

wherein $R_1$ represents a linear or branched alkyl or alkoxy containing 1 to 10 carbon atoms or a linear or branched alkenyl or alkenyloxy containing 2 to 12 carbon atoms.

15. The liquid crystal composition of claim 1, wherein the compound of general formula II is any one or a combination of at least two of compounds having the following structures:

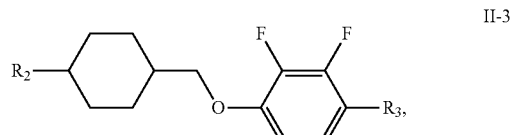
II-3

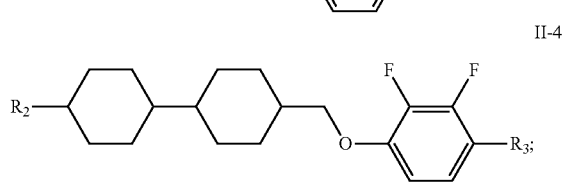
II-4 wherein $R_2$ and $R_3$ each independently represent a linear or branched alkyl or alkoxy containing 1 to 10 carbon atoms or a linear or branched alkenyl or alkenyloxy containing 2 to 12 carbon atoms.

16. The liquid crystal composition of claim 1, wherein the compound of general formula III is any one or a combination of at least two of compounds having the following structures:

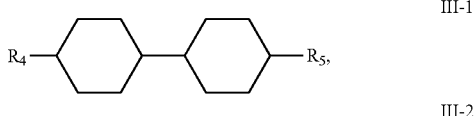
III-1

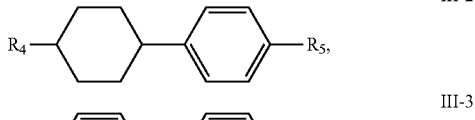
III-2

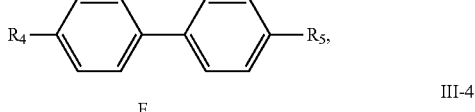
III-3

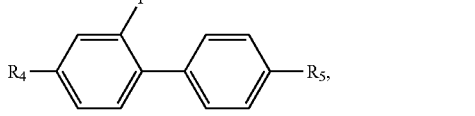
III-4

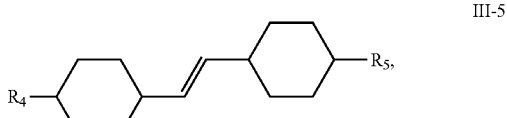
III-5

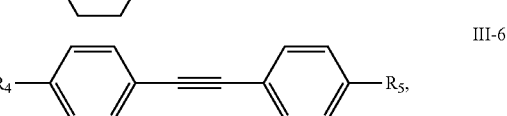
III-6

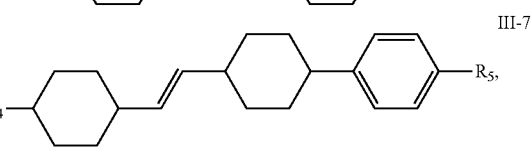
III-7

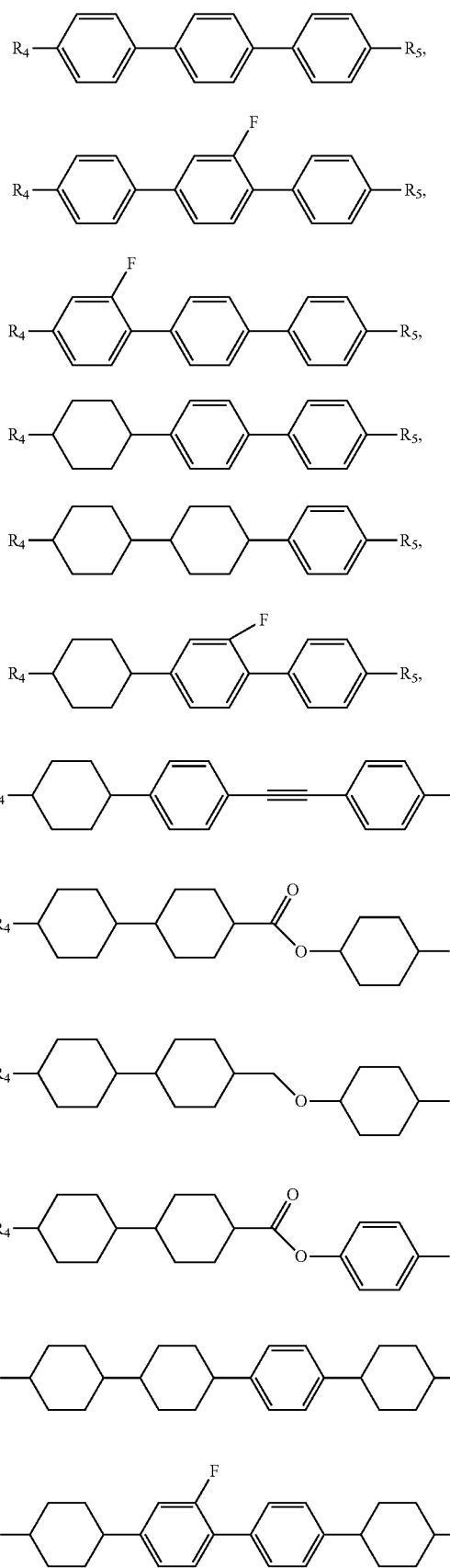
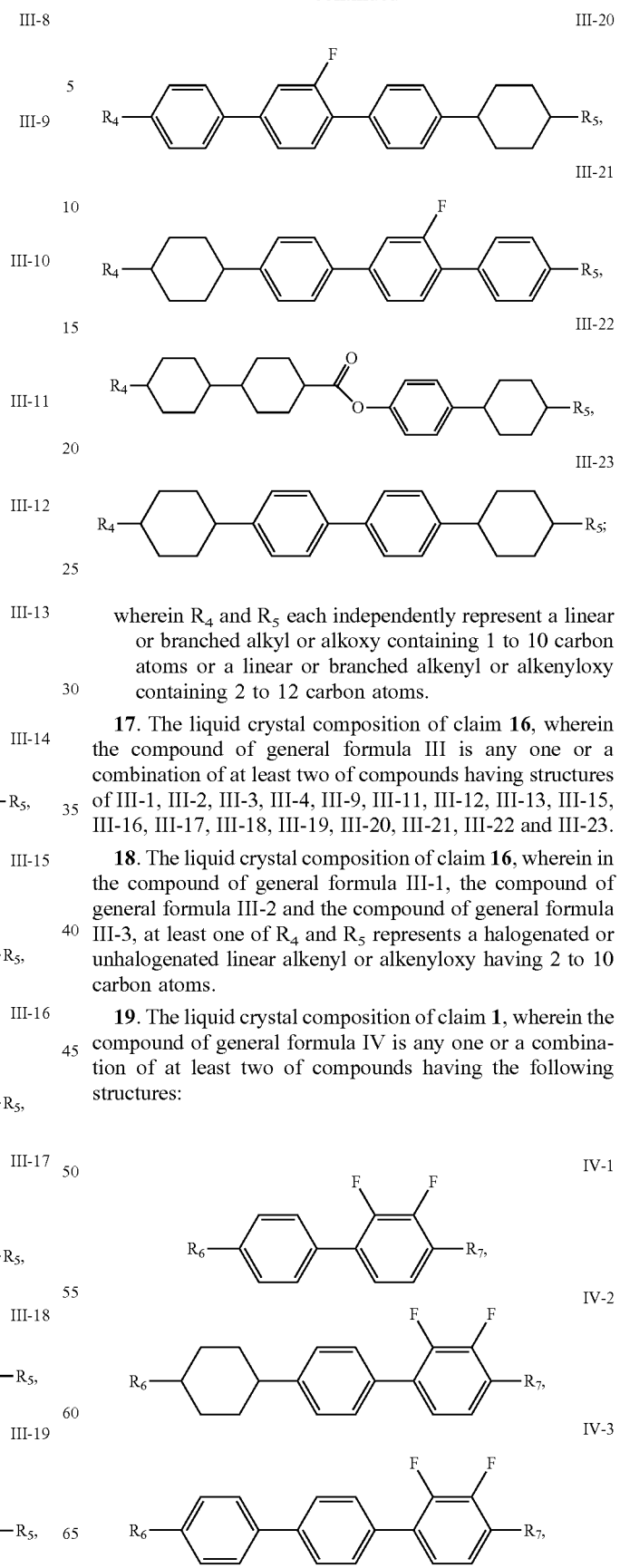

wherein $R_4$ and $R_5$ each independently represent a linear or branched alkyl or alkoxy containing 1 to 10 carbon atoms or a linear or branched alkenyl or alkenyloxy containing 2 to 12 carbon atoms.

17. The liquid crystal composition of claim 16, wherein the compound of general formula III is any one or a combination of at least two of compounds having structures of III-1, III-2, III-3, III-4, III-9, III-11, III-12, III-13, III-15, III-16, III-17, III-18, III-19, III-20, III-21, III-22 and III-23.

18. The liquid crystal composition of claim 16, wherein in the compound of general formula III-1, the compound of general formula III-2 and the compound of general formula III-3, at least one of $R_4$ and $R_5$ represents a halogenated or unhalogenated linear alkenyl or alkenyloxy having 2 to 10 carbon atoms.

19. The liquid crystal composition of claim 1, wherein the compound of general formula IV is any one or a combination of at least two of compounds having the following structures:

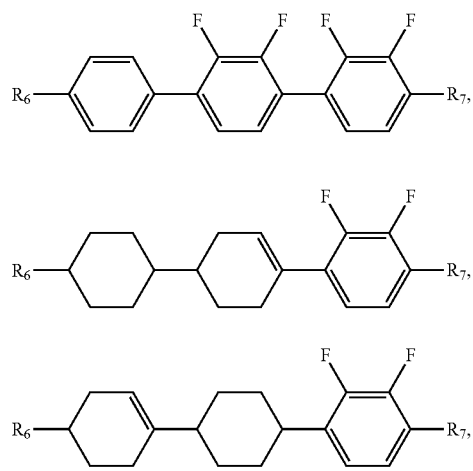
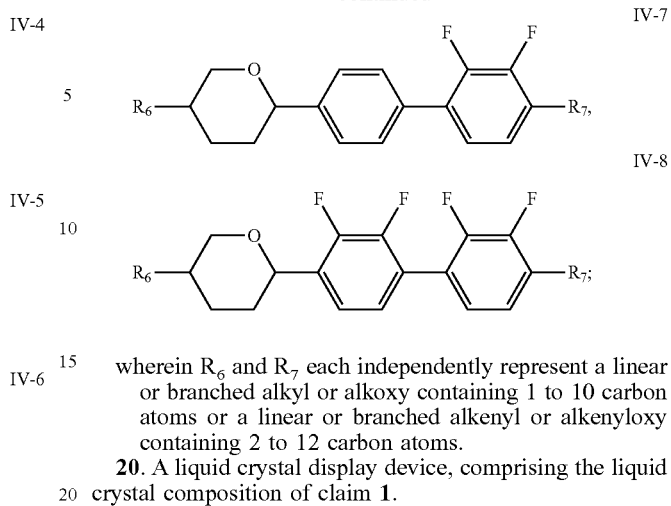
wherein $R_6$ and $R_7$ each independently represent a linear or branched alkyl or alkoxy containing 1 to 10 carbon atoms or a linear or branched alkenyl or alkenyloxy containing 2 to 12 carbon atoms.
20. A liquid crystal display device, comprising the liquid crystal composition of claim 1.
* * * * *